P. G. WHEELER.
TEST INDICATOR.
APPLICATION FILED JAN. 7, 1909.
937,978.
Patented Oct. 26, 1909.
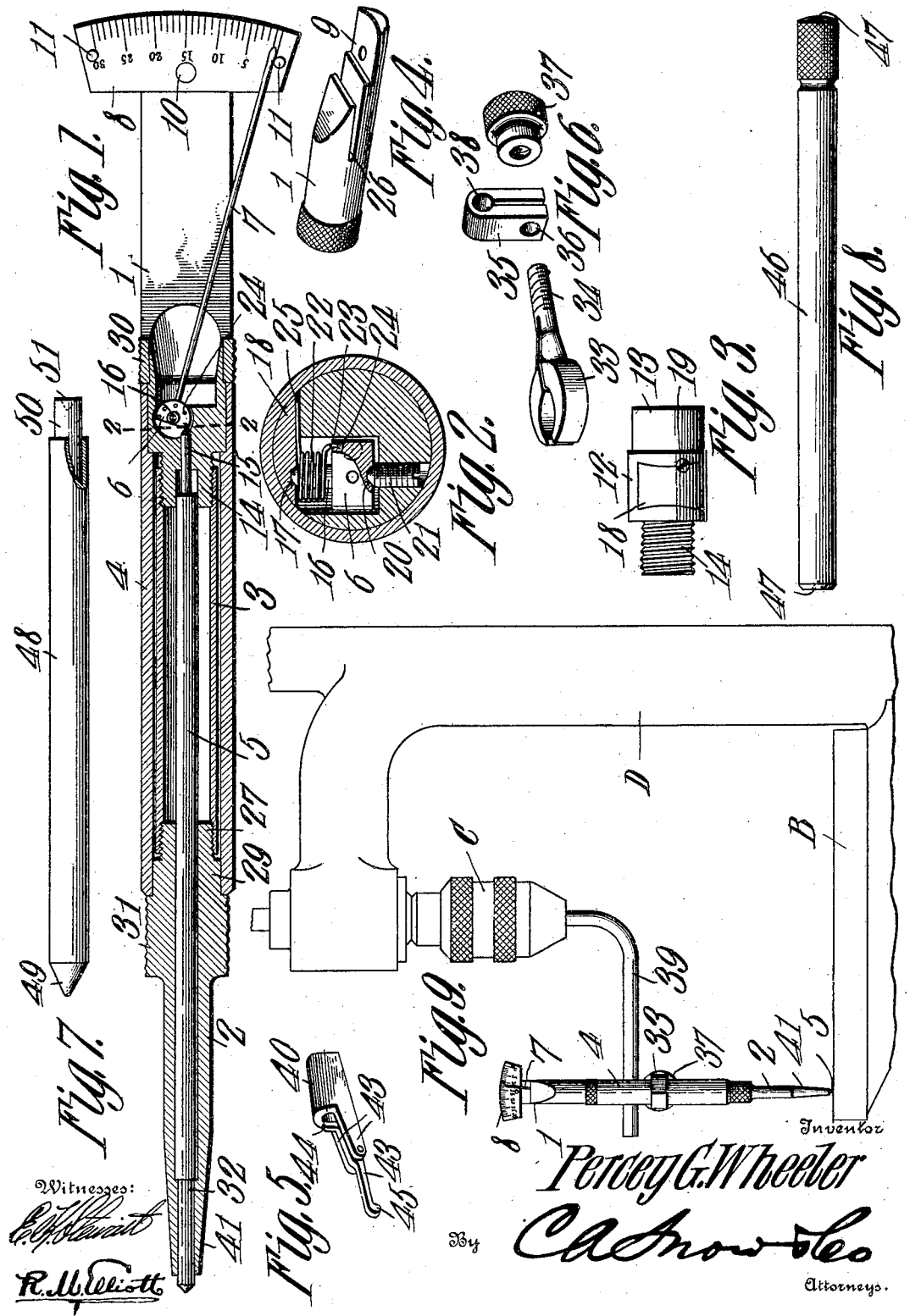

UNITED STATES PATENT OFFICE.

PERCEY G. WHEELER, OF ORANGE, MASSACHUSETTS.

TEST-INDICATOR.

937,978. Specification of Letters Patent. Patented Oct. 26, 1909.

Application filed January 7, 1909. Serial No. 471,199.

*To all whom it may concern:*

Be it known that I, PERCEY G. WHEELER, a citizen of the United States, residing at Orange, in the county of Franklin and State of Massachusetts, have invented a new and useful Test-Indicator, of which the following is a specification.

This invention relates to test indicators for use by machinists.

The object of the invention is to provide an implement of this character which shall be simple of construction, durable in use, and thoroughly efficient in operation, and which shall be adapted for testing any character of work, in connection with any kind of machinery where it is desirable to ascertain if certain parts thereof are absolutely true, or bear a true relation to another part, or parts.

With the above and other objects in view, as will appear as the nature of the invention is better understood, the same consists in the novel construction and combination of parts of a test indicator, as will be hereinafter described and claimed.

In the accompanying drawings forming a part of this specification, and in which like characters of reference indicate corresponding parts, Figure 1 is a view in elevation, partly in section, of a test indicator constructed in accordance with the present invention. Fig. 2 is a transverse sectional view, on an enlarged scale, taken on the line 2—2 of Fig. 1 and looking in the direction of the arrow thereon. Fig. 3 is a detail view of a portion of the implement. Fig. 4 is a perspective detail view of another portion of the implement. Fig. 5 is a perspective detail view of an attachment to be used in making inside tests. Fig. 6 is a collective detail view, in perspective, of an attachment for securing the indicator to the arm of a surface gage, or a part of the machine in testing certain kinds of work. Fig. 7 is a view in side elevation, partly in section, of a spring center to be used in conjunction with the face plate of a lathe in centering work thereon. Fig. 8 is a similar view of a testing arbor used in lining lathe centers. Fig. 9 is a view in side elevation, displaying one manner of using the implement in leveling the bed plate of a drill press.

The implement constituting the subject matter of this invention is adapted for use in connection with boring machines, milling machines of any character, lathes, grinders, planers, shapers, drill presses, or in any position where its use may be required, and as its application will be obvious, but a single manner of operating the same is herein illustrated, which is shown in Fig. 9, wherein its manner of use in leveling the bed plate of a drill press is exhibited.

Before entering into a description of the implement, it may be stated that the implement is made of round stock which will enable it to be adjusted to any position, and all the wearing parts are hardened in order to prolong the life of the device.

The implement comprises a head 1, a nose-piece 2, a coupling tube 3 for detachably connecting the head and the nose piece, a sleeve 4 inclosing the coupling tube, a plunger 5, an eccentric 6 with which one end of the plunger engages, a pointer or hand 7 carried by the eccentric, and a segmental scale or dial 8 carried by the head. The head is rabbeted at its outer end at 9 to receive the scale 8, which latter is held in position by a screw 10. The scale is herein shown as graduated from zero to thirty, but it will be obvious that this arrangement is purely arbitrary, and may be varied to suit the taste of the user. At each end of the scale is a post 11, the two operating to limit the swing of the needle 7.

The eccentric 6 is arranged within a chamber formed in a casing 12, the terminals of which are reduced, one terminal 13 being smooth and being held frictionally engaged in an opening in the head, and the other terminal 14 being threaded and engaged by the coupling tube 3. The eccentric 6 is approximately semi-circular in shape, and its flat side is engaged by the reduced pointed end 15 of the plunger 5, the said end being mounted for reciprocatory movements in a longitudinal orifice in the terminal 14 and casing 12, as clearly shown in Fig. 1. As will be obvious, the fit between the end 15 of the pointer and the bore in which it works must be accurate in order to insure proper operation of the implement.

The eccentric has projecting from one side a pin 16, the outer end of which is reduced, or pointed, and engages with a similarly shaped seat 17 formed in the inner face of a dovetailed bearing plate 18 that is held assembled with the casing by a screw 19. The other side of the eccentric is provided with a cone-shaped seat 20 that is arranged in axial alinement with the pin 16 and is engaged by the inner pointed end of a screw 21 that is carried by the casing. This screw is of great importance, inasmuch as by its proper manipulation the necessary adjustment of the eccentric may be secured to cause it to operate without any lost motion, so that the readings of the pointer 7 will be absolutely true. In order to cause the pointer normally to occupy the position shown in Fig. 1, or resting against the post 11 adjacent to the zero end of the scale, there is a coiled spring 22 provided, one terminal whirl of which is bent to provide a finger or toe 23 that is adapted to engage any one of a series of orifices 24 in one side of the eccentric, and the other terminal whirl of which is extended and engages a seat 25 formed in one wall of the casing, and in which it is held by the bearing plate 18. As will be obvious, by shifting the toe 23 into engagement with any one of the orifices 24, the tension of the spring 22 may be regulated. In order to permit the pointer to swing through the requisite arc, the head 1 is provided with a transverse slot 26, as clearly shown in Fig. 4.

As will be seen by reference to Fig. 1, both ends of the coupling tube are interiorly threaded, the threads of one end, as above pointed out, being engaged by the threaded terminal 14 of the casing 12, and the threads of the other end being engaged by the threaded terminal 27 of the nose piece 2. Both the casing and the nose piece are provided with a reduced extension 28 and 29, respectively, that are engaged by the terminals of the sleeve 4, which bears against the shoulders formed by the reduced portions. Both the head and the nose piece are knurled, as shown at 30 and 31, in order to provide gripping surfaces by which the nose piece may be forced against the sleeve, thus to secure proper assemblage of the parts. In addition to this, this manner of combining the head and nose piece will permit the former to be adjusted when held in a rest, thus to bring the dial to the best position to observe the readings thereon, and to secure this result it will only be necessary slightly to loosen the nose piece, turn the head to the desired angle, and then tighten up the parts. The terminal 32 of the plunger that contacts with the object to be tested is reduced, and the orifice in the nose piece is counterbored to receive the terminal 32, whereby to hold the plunger against accidental separation from the tool.

As shown in Fig. 9, the implement is positioned for adjusting or leveling the bed plate B of a drill press D, and to secure this result it will be necessary to provide means whereby the indicator may be properly held by the chuck C. To secure this result, the attachment shown in Fig. 6 is employed, which comprises a split collar 33 having a threaded shank 34, a clamp 35 having an orifice 36 to receive the shank 34, and a binding nut 37 to engage with the threaded shank. The clamp is split longitudinally and is provided with an orifice 38 extending at right angles to the orifice 36, and which is designed to receive an approximately L-shaped arm 39, which is engaged by the chuck C. As will be obvious, by tightening the nut 37, the clamp will be caused to engage with the arm 39 with sufficient force to hold the implement properly assembled therewith. In truing the bed plate B, the plunger is brought into engagement therewith adjacent to its periphery, and the pointer is examined to determine what graduation mark is registered. The arm 39 is then swung by turning the chuck to another position, say at right angles to that first employed, and a second reading is taken, and, if the pointer shows that this portion of the bed is higher or lower than that constituting the starting point of the test, the proper adjustment of the bed will be made to correct this error. Then a third test is taken, and as many more as may be necessary, until the implement is brought back to its starting point. This mode of operation obtains where outside and surface work is to be tested, and it will be obvious that the arm 39 may represent that of a surface gage.

For testing work upon a planer, where it is desired to have the stock arranged with absolute accuracy with relation to the cutter or bit for edge work, the attachment shown in Fig. 5 is employed, which consists of a sleeve or collar 40 having a tapered bore to engage the tapered outer end 41 of the nose piece, and with two parallel disposed arms 42 between which is pivoted a lever or arm 43, the terminals of which are bent in opposite directions approximately at right angles to the length of the lever to provide two toes 44 and 45, the former of which is arranged opposite the bore of the sleeve and in position to be engaged by the outer end of the plunger. Where testing edge work, say on a planer, the implement will be clamped in the tool post, and the attachment or sleeve 40 will be assembled with the nose piece. After the work has been properly clamped upon the planer bed, and the tool post adjusted to bring the toe 45 into engagement with the outer edge of the work, upon the bed being moved and the scale being observed, the absolute accurate adjustment of the work upon the bed may be secured. It is also to be understood that the attachment shown in Fig. 5 is to be used for inside work, such as in determining whether the walls of a cylinder are parallel with the longitudinal axis of the lathe centers.

For determining whether the two centers of a lathe are in exact alinement or not, the indicator will be clamped in the tool post, and the testing arbor 46, shown in Fig. 8, will be engaged by the two centers, for which purpose terminal seats 47 are provided for the center points. Upon the tool rest being moved along the testing arbor, and by observing the pointer, any deflection, or want of alinement, of the two centers may instantly be determined.

For centering work upon a face plate, the attachment shown in Fig. 7 is employed, which comprises a tube 48 having one end 49 pointed and its other end provided with a spring pressed member 50 having a center point seat, the whole constituting a spring center. After the piece of work has been punched and clamped to the face plate, the spring center is positioned, the point 49 being in engagement with the work, and the seat 51 engaged by the center. The indicator is now clamped in the tool rest with the attachment shown in Fig. 5 assembled with it, and upon the face plate being revolved with the toe 45 in engagement with the spring center, it may readily be determined whether the work is properly positioned or not.

From the foregoing description, it will be seen that by the use of this implement, testing of any character of work may be readily and accurately secured in an expeditious and thoroughly practical manner.

I claim:—

1. A test indicator comprising a head carrying a dial and a pointer, a nose piece, means for connecting the head and nose piece, a plunger for actuating the pointer, and a sleeve inclosing the connecting means in a manner to permit of rotation of the head and nose piece.

2. A test indicator comprising a head carrying a dial, a casing secured to the head, an eccentric pivoted within the casing and carrying a pointer to traverse the dial, a nose piece, a coupling member for connecting the nose piece and the head, a plunger for engaging the eccentric, and a sleeve inclosing the connecting means in a manner to permit of rotation of the head and nose piece.

3. A test indicator comprising a head provided with a dial, a casing secured to the head, an eccentric within the casing, mounting means for the eccentric adjustable to prevent lost motion, a pointer connected to the eccentric and adapted to traverse the dial, a spring coacting with the eccentric to return it to normal position after being actuated, a nose piece, a coupling tube connecting the nose piece and head, and a plunger projecting at one end beyond the nose piece and having its other end in engagement with the eccentric, and a sleeve inclosing the connecting means in a manner to permit of rotation of the head and nose piece.

4. A test indicator comprising a head provided with a dial and with a longitudinal slot, a casing secured to the head, an eccentric adjustably mounted within the casing and provided in one face with a plurality of orifices, a spring having one terminal whirl in engagement with one of the orifices, and its other terminal whirl clamped against movement, a pointer carried by the eccentric and working in the slot of the head, a nose piece, a coupling tube connecting the casing and the nose piece, a sleeve inclosing the coupling tube and portions of the casing and the nose piece, and a plunger having one end projecting beyond the nose piece and its other end in engagement with the eccentric.

In testimony that I claim the foregoing as my own, I have hereto affixed my signature in the presence of two witnesses.

PERCEY G. WHEELER.

Witnesses:
E. L. BOWERS,
EDW. C. BUELL.